Oct. 20, 1942.                D. E. GRAY ET AL                2,299,228
                              ELECTRIC CONDENSER
                              Filed Jan. 12, 1939

INVENTORS:
Donald E. Gray
BY Joseph O. Ollier
ATTORNEY.

Patented Oct. 20, 1942

2,299,228

UNITED STATES PATENT OFFICE 2,299,228

ELECTRIC CONDENSER

Donald E. Gray, Teaneck, N. J., and Joseph O. Ollier, New York, N. Y., assignors to Radio Patents Corporation, a corporation of New York Application January 12, 1939, Serial No. 250,468
In Germany January 12, 1938

15 Claims. (Cl. 175—315)

This invention relates to electric condensers, more in particular to static and electrolytic condensers.

It is an object of the invention to increase the capacity of such a condenser body calculated upon the volume occupied by it.

It is another object of the invention to manufacture such a condenser in a new and more efficient way than heretofore.

Figure 1:
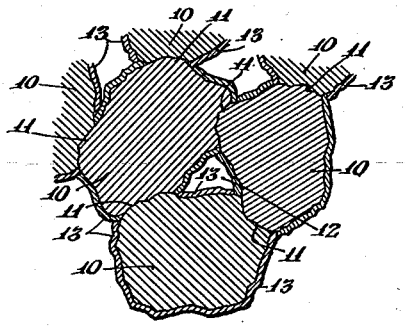
Figure 3:
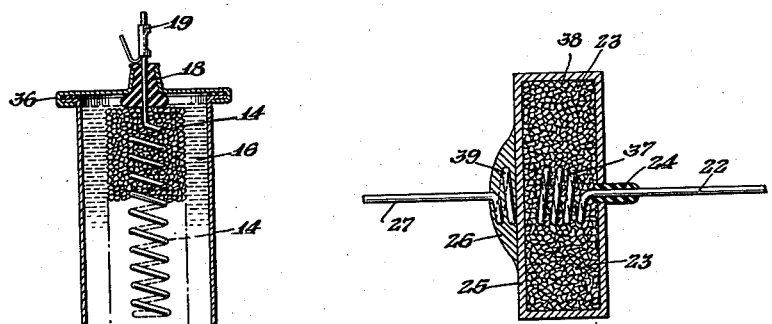
Figure 2:
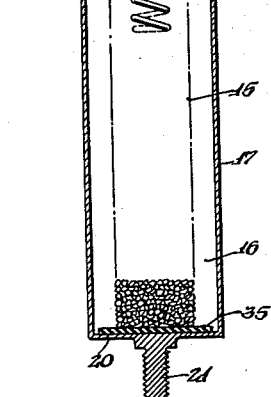
Figure 4:
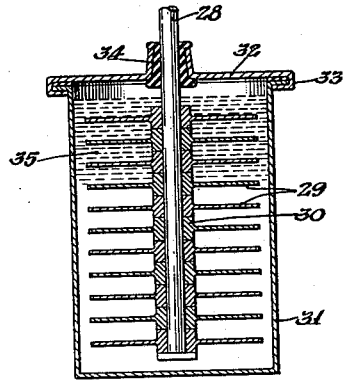

These and other objects of the invention will more readily be understood when this specification proceeds with reference to the drawing in which Fig. 1 shows a cross-section through a portion of the new condenser on a greatly increased scale, whereas Figs. 2, 3, and 4 show cross-sections through preferred embodiments of the invention.

Electrical condensers have been made heretofore of electrodes spaced from each other by suitable media, either fluid, pasty or solid. In particular porous spacers have been used, impregnated with an additional dielectric medium or an electrolyte.

According to this invention the body of the condenser is composed of a multitude of small and substantially metallic particles pressed or agglomerated by any suitable process into a porous spongy body. The surfaces of the body surrounding the pores are then covered or coated by a dielectric layer, such as an oxide-film, and thereupon the pores are filled with a liquid or solid electrically conductive substance, such as an electrolyte or metal introduced in its molten state in the pores and then allowed to cool and solidify within the pores. The metal of the porous body is connected with one and the conductive substance filling the pores with another terminal, and thus an electrical condenser is obtained the porous body of which forms one and the filling substance the other electrode, these electrodes being separated by the dielectric cover or coating applied to the surfaces surrounding the pores.

Depending upon the nature of the filling substance, a static or electrolytic condenser is obtained.

Referring to Fig. 1, the principle of the invention may be explained more in detail.

Substantially metallic particles 10 are obtained by comminuting any suitable substantially metallic substance or alloy or mixture to a desired degree, such as 30 to 5 microns diameter of the particles; but also finer powders may be used, either comminuted for the purposes of the invention, or as available in commerce, or as they are obtainable by chemical instead of, or in addition to mechanical comminuting processes such as consisting in grinding the metal or metals or alloys in ball mills for one or more hours or even days.

These particles of the same composition or mixtures of two or more kinds of different compositions of metals or alloys are preferably shaken in order to reduce preliminarily the volume occupied by them, and then pressed at normal or elevated temperature but below their sintering temperature. Thus a porous body is obtained the particles 10 of which intimately contact each other or even are coalesced at 11. They enclose pores 12 of larger or smaller size, depending upon the size of the particles, the degree of pressure applied, and if a heat treatment is used, upon the temperature applied. In order to avoid closing of the pores, temperatures substantially below high sintering temperature of the particles, or mixture thereof should be used, such as e. g. fritting or presintering temperatures only. In any case a spongy, loose of mechanically coherent body is obtained the pores of which are interconnected throughout the body.

If tantalum is used as a film forming metal then it is advisable to use grains passing through a sieve of a mesh between 15 and 300 per cm.$^2$. If aluminum is used, then its grains are best measured by a sieve of from about 15 to 150 mesh per cm.$^2$, but it should be understood that the invention is not confined to the size of grains in any single case. If powder of tantalum is used this may initially be compressed, while aluminum is only subjected to slight pressure or none at all and is then shaken. For fritting tantalum the temperature is raised to from 1850° to 2100° C. and is kept there from about 5 minutes to one hour, while aluminum is heated to about 500° to 600° C. and kept at this temperature for about 2 to 30 minutes. Generally speaking the heating should be the shorter the higher the temperature is held within the approximately given limits. Equally a pressure of moderate amount should only be applied simultaneously with heating if lower temperatures are applied. But it should be understood that the invention is in no way limited in its scope either by temperature or by the amount of pressure.

If fritting and presintering has been previously mentioned, then this is to designate the state of the metal in which its particles begin to soften without any appreciable change of form, or at least start to be sticky, so that small particles begin to stick together on edges or parts of the surfaces contacting one another, and after cooling remain so. In general that temperature is appropriate at which the metal particles begin to coalesce forming a coherent body which however possesses a desired porosity and therefore is sponge-like.

The connection between the small metal particles is necessary in order that the electric current in charging or discharging a so formed condenser may find a path without meeting too great and undesirable resistance. The connection of the small particles is also desirable in order to get a self-supporting body although this is not a condition for the invention. It will be appreciated that a mechanical contact between the grains is sufficient for the passage of the current. Therefore it also forms part of the invention that the grains of desired size and shape are tightly enclosed in a receptacle of metal or insulating material in such a manner that they contact one another permanently.

The invention also embraces a porous spongy body or skeleton produced thereby that a more or less dense body is made from an initial mixture of two or more materials of which at least one is a metal or alloy. The initial mixture is then shaped and, if desired, agglomerated in a manner described above, and then at least one of the materials contained therein is removed by chemical treatment. An acid may be used which dissolves the respective material, while it does not attack at all or only slightly, the other material. Thus e. g. titanium and aluminum may be mixed, and by melting a coherent body may be formed therefrom. By treatment with chloric acid the aluminum may be removed, leaving a porous titanium skeleton on which the dielectric layer is formed. But one of the materials may also be likewise evaporated by heating provided that the other material remains solid at the boiling temperature of this body.

After the skeleton has been prepared in any way described above, an oxidation of the exposed surfaces of the particles of which the skeleton is composed, is carried through by causing an oxidizing fluid, such as oxygen, air or a liquid of oxidizing properties, such as an acid solution, to penetrate into the pores. Applying of a vacuum before and/or during penetration of the porous body by that fluid is sometimes of advantage. The body may also be heated up to oxidizing temperature of its particles, if need be, and/or in order to accelerate the oxidizing reaction. Care has to be taken that this temperature remains substantially below high sintering temperature. Thus a coherent oxide layer 13, Fig. 1, is obtained, covering or coating continuously all the surfaces of the particles exposed to the pores without interrupting or affecting their contacts at 11.

It may suffice to heat the body in open air up to its oxidizing temperature and to keep it there for such a period of time that all surface portions surrounding the pores are completely oxidized. The oxidation may be carried further to give the oxide-layer a desired depth. The oxidation may also take place in an atmosphere enriched by oxygen or in one solely composed of it. Aside from gases also vapors may be used, which in contact with the metal and at suitable temperatures develop oxygen and thereby bring about the desired oxidation, or help to finish it. Apart from gases and/or vapors also liquids of oxidizing nature may be used, e. g., electrolytic liquids containing weak acids, and they may be connected with the minus-pole of a D. C. source while the plus-pole is connected to the metals to be oxidized. This formation of an oxide layer is continued until a dense film of desired thickness is obtained.

Different types of film-forming metals require formation in different types of film-forming electrolytes. As an example, if the spongy body is of aluminum particles, an aqueous solution of borax and boric acid may be used with a suitable electrical current. If magnesium is used it may be suitably film-formed by immersing it for approximately 15 minutes in boiling distilled water without application of a current. If tantalum is used, a suitable electrolyte is an aqueous solution of sulphuric, oxalic, or chromic acid with application of a suitable electric current. Titanium is best filmed in an oxygen atmosphere at elevated temperature.

The skeleton metal can also be made, as mentioned above, of solid solutions or alloys of two or more metals. If one mixes e. g. approximately 85% to 95% aluminum with 15% to 5% beryllium and heats the mixture up to about 900° to 1050° C. then these metals form a melt which upon cooling forms a solid solution or mixed crystals. The two metals do not enter into a chemical combination but form in the main an alloy. Such an alloy is thereafter comminuted, shaped and fritted at a temperature of about 640° to 700° C. The skeleton thus obtained is then oxidized at temperatures below the fritting temperature, and a dense and strong dielectric layer is obtained of which the dielectric constant lies above that of the aluminum oxide due to the presence of beryllium oxide.

Titanium has the property to form an oxide possessing a very high dielectric constant. By compounding it e. g. with aluminum, an aluminum-titanite AlTi, is obtained, which can be used for making a condenser in any way described above. The dielectric oxide layer produced on such a skeleton has a dielectric constant which lies considerably above that of aluminum oxide alone though below that of titanium oxide alone.

One can also form mixed crystals of molybdenum and titanium by heating a mixture of both metals in a neutral atmosphere above about 1000° to about 2300° C. (the temperature should be the higher the larger the content of molybdenum is). By oxidation of the exposed surface of a skeleton made from such an alloy or solid solution, one obtains a dielectric layer consisting in the main of titaniumoxide of high dielectric constant. An initial mixture from 1 to 20 parts by weight of titanium with one part of molybdenum is preferred. As titanium is by far lighter than molybdenum, the oxide layer always contains an excess of titaniumoxide. By the small addition of molybdenum the poor electrical conductivity of titanium is considerably improved, and due to the great excess of titaniumoxide the dielectric constant of the layer is correspondingly high. Molybdenum can be replaced by any other suitable metal, and titanium e. g. by zirconium, magnesium. There may also be used e. g. alloys of titanium-silicon-copper or of titanium-silicon-nickel.

Besides oxide-film forming metals such as tantalum, aluminum, titanium, zirconium, magnesium, iron and even copper, also metals may be applied which only form insignificant electric layers but on which dielectric substances in finest layers, e. g. by chemical or physical means can be deposited. In that way e. g. a metallic mixture of grains enclosed in a receptacle can be treated with a solution containing oxides or capable of depositing them when left standing. The deposit may also be caused or aided by increase of temperature or by the passage of an electric current.

After a coherent layer of desired depth and strength is obtained in any such manner, the oxidizing or coating fluid is withdrawn, if need be, as it is particularly the case if a liquid or solution has been used. Vacuum and/or drying heat can also be applied to advantage.

Now an electrically conductive substance is introduced in the pores of the spongy body to fill them. To this effect metal of any composition in its molten state may be soaked or infiltrated into the body. Care has to be taken that the melting point of such metal is substantially below the temperature at which the coating 13 could be dissolved in that melted metal or the particles be melted. Also a liquid electrolyte, or a suitably heated and thereby liquefied electrolyte may be soaked into the pores and, in the latter case, permitted to solidify by cooling. The body should be suitably heated if melted metal or liquefied electrolyte is soaked in, so that upon cooling the metal or electrolyte intimately contacts the layer 13 over its entire extent. Vacuum can again be applied during or/and before soaking the substance into the pores.

When the spongy body consists e. g. of tantalum particles and if the surfaces of the pores have been provided with an oxide-film in the way described above, then it suffices to position a copper or aluminum sheet upon the body and to heat it so far that the copper or aluminum melts. It is then at once absorbed by the porous body by capillary action. Mostly it is not at all necessary to over-heat the metal sheet and to give it thereby greater fluidity. In this manner one obtains e. g. a spongy body of tantalum, the pores of which are superficially covered with oxide and contain a ramified continuous aluminum or copper piece which is tightly filling the pores and intimately contacting the oxide film. In other words, one obtains a skeleton of electrically conductive coherent tantalum the interior surface of which is covered with an oxide film as a dielectric and filled with metal such as copper or aluminum.

If liquefied copper is filled into the spongy body of tantalum then no change of the oxide film will occur owing to the low affinity of the copper and oxide film. The melting point of copper is considerably lower than those of the oxide of tantalum and of the latter itself. The same holds true for aluminum, excepting that aluminum possesses great affinity to the oxygen contained in the tantalum oxide. Assuming however that the infiltrating hot aluminum decomposes the tantalum oxide into metallic tantalum and oxygen and then combines superficially with the oxygen, there would again result an oxide (aluminum oxide or a mixture of aluminum oxide and tantalum oxide) separating the infiltrated aluminum body from the skeleton of tantalum. Such a condenser may be used especially for alternating current and even as a rectifier. If aluminum is used for the production of the skeleton then aluminum may also be used as infiltrating metal whereby the high melting point of aluminum must be taken into consideration and a lower melting aluminum alloy should be preferred. One obtains thereby an aluminum-aluminum-oxide-aluminum condenser which may be inserted in any circuit and is not polarized.

For infiltrating purposes one can also use a metal of lower melting point, e. g., bismuth, antimony, tin, zinc.

If an electrolyte is used, it may be of the film-forming type, e. g., one obtained by boiling a multivalent alcohol and a borate.

If the metal skeleton is to be filled with a fluid electrolyte, then the latter may be poured e. g. into a suitable container open at the top, the skeleton evacuated and dipped into the liquid electrolyte. Then the vacuum is removed and the electrolyte allowed to penetrate into the pores of the body under atmospheric or even elevated pressure. The electrolyte may even cover the metal skeleton also on its outside. Thereupon the container is closed by a lid or cover and sealed; if necessary, an opening for vents is provided for gases or vapors which may develop during operation of the condenser.

It is to be understood that the invention is not limited thereto that particles of a single metal form the metal skeleton. It may be made e. g. by fritting tantalum and titanium particles, or titanium and zirconium particles, or tantalum and aluminum particles, and if desired any number of different metals of equal or different sizes of the particles may be mixed and the metal skeleton formed therefrom. The use of metals such as titanium, zirconium, is very desirable as these metals form oxides of extraordinarily high dielectric constants.

Thus a static or electrolytic condenser body is obtained, one electrode of which consists of the spongy body composed of particles 10 in electrical contact with each other, the other electrode consisting of the conductive medium filling the communicating pores 12, whereas the dielectric separating these electrodes is constituted by the coherent layer or coating 13. The particles on one hand and the conductive medium on the other hand are then to be connected with suitable terminals.

By the invention condensers are obtained presenting an extraordinary large surface development of the metal used. The electrodes are in most intimate and permanent contact with the dielectric which possesses optional thickness and by proper choice of the metal or metals to be oxidized also any desired dielectric property. Thus surprisingly high capacity values can be obtained.

The metal skeleton may be given any desired shape. It may be fritted immediately in this shape. One can manufacture by fritting e. g. a cylinder of any desired length and slice off discs of any desired thickness each forming the metal skeleton for a condenser element. One can shape a porous cylinder simultating a wire of desired diameter and subdivide it into optional lengths. It then can be further shaped, if desired, e. g. in the form of a spiral or be impregnated with metal or a liquid and then be used as a condenser.

Referring to Fig. 3, in a spongy body of loose or coherent particles 23 the helically wound end 37 of a terminal 22 is embedded in intimate contact with said particles. Thereupon a dielectric layer is formed in the pores of the body which also covers the terminal and its end without interfering with its contact with the particles. Now the other substance 38, preferably liquid metal, is filled into the pores and a casing 25 applied thereto. This casing consists at least in part of metal and contacts the substance 38. It is insulatingly separated from the terminal 22 at 24. Another terminal 27 is applied, e. g., soldered to a conductive portion of the casing 25 at 26. Thereby e. g. a static condenser or rectifier is obtained.

Referring to Fig. 2 a suitable terminal wire 14 is embedded in a molded spongy body during the pressing operation for making electrical connection thereto, and may be spiraled or flattened to increase the contact area to the pressed film-forming metal particles. A terminal may also be secured to the fritted body by soldering, welding, screw-threading or the like. Thereupon the body 15 and wire 14 are film-formed in an aqueous or non-aqueous electrolyte or may be oxidized in an oxygen bath at elevated temperature or a combination of the above processes may be used. The filmed spongy anode 15 is assembled in a container 17 which may serve as a cathode and may be separated therefrom by a suitable porous insulation, if need be. An electrolyte 16 is filled in the container 17 which may be the same or different from the film-forming electrolytes given above. The bottom 20 of the container 17 may have a threaded extension 21 for securing or mounting the condenser, or serving as a terminal in an electrical circuit. The terminal wire 14 extends from the anode 15 through an insulating and resilient bushing 18 such as rubber, which is pressed into a cover plate which may be of metal or insulating material and which has a tapered neck opening placed over the bushing 34. The edges 36 of the container and cover are connected by pressing, rolling, or the like. The base of the bushing 18 rests preferably on the top of the anode 15 which in turn rests on the inner bottom 20 of the container 15 but is insulated therefrom e. g. by a glass fibre sheet material 35. 19 is a connecting lug or the like. Obviously the shape of the anode 15 may be different from the rod-like shape shown in Fig. 3. For example, in cases where a low power factor is desired, the anode shape may be a thin hollow tube and an additional cathode may be spaced through its center. The additional cathode may be connected to the container 17 or cathode which surrounds the outer portion of the anode.

Referring to Fig. 4, a number of as thin as possible disc shaped spongy electrodes 29 are arranged as close as possible to each other on a rod 28 serving as a terminal, and thereupon a dielectric layer is applied to the exposed surfaces of the pores and of the rod 28. The lugs 30 keep the discs 29 in desired distance from each other. The thus prepared anodes 29 are inserted in a container 31 serving as a cathode, an electrolyte 35 is filled in and the container is closed by spinning the edge 33 of the cover 32 over the upper edge of container 31. The rod 28 is held in the cover 32 preferably by means of a pressed in tapered plug 34 of rubber.

It is understood that additional conductive fins may be connected with container 31 reaching between the discs 29 for shortening the path of the current between the discs and the cathode.

The invention is not limited to any of the exemplifications of the drawing but to be derived in its broadest aspect from the appended claims.

What we claim is:

1. An electric device, such as a condenser and rectifier, composed of two electrodes separated by a dielectric layer, one of said electrodes consisting of a porous body composed of substantially metallic particles of small size connected with each other in contacting surface portions and leaving pores between them, said dielectric layer provided on the surface portions of said particles exposed to said pores, and the other one of said electrodes consisting of a solid substantially metallic substance filling said pores in intimate contact with said dielectric layer.

2. An electric device, such as a condenser and rectifier, composed of two electrodes separated by a dielectric layer, one of said electrodes consisting of a porous body composed of substantially metallic particles of small size in electrically conductive contact with each other and leaving pores between them, said particles fritted together at contacting surface portions so as to form a spongy self-supporting body, said dielectric layer provided on the surface portions of said particles exposed to said pores, and the other one of said electrodes consisting of a solid electrically conductive and dense substance filling said pores in intimate contact with said dielectric layer.

3. An electric device, such as a condenser and rectifier, composed of two electrodes separated by a dielectric layer, one of said electrodes consisting of a porous body composed of substantially metallic particles of small size in electrically conductive contact with each other and leaving pores between them, said dielectric layer provided on the surface portions of said particles exposed to said pores, and the other one of said electrodes substantially consisting of metal filling said pores in intimate contact with said dielectric layer.

4. An electric device, such as a condenser and rectifier, composed of two electrodes separated by a dielectric layer, one of said electrodes consisting of a porous body composed of substantially metallic particles of small size in electrically conductive contact with each other and leaving pores between them, said dielectric layer provided on the surface portions of said particles exposed to said pores, and the other one of said electrodes consisting of a solid electrically conductive and dense substance filling said pores in intimate contact with said dielectric layer, said particles electrically connected with a terminal insulatingly passed through said substance.

5. An electric device, such as a condenser and rectifier, composed of two electrodes separated by a dielectric layer, one of said electrodes consisting of a porous body composed of substantially metallic particles of small size in electrically conductive contact with each other and leaving pores between them, said dielectric layer provided on the surface portions of said particles exposed to said pores, and the other one of said electrodes consisting of metal filling said pores in intimate contact with said dielectric layer, an electrically conductive solid body arranged outside said pores and particles in electrically conductive contact with said metal, and a terminal attached to the outside of said body.

6. An electric device, such as a condenser and rectifier, composed of two electrodes separated by a dielectric layer, one of said electrodes consisting of a porous body composed substantially of metallic oxidizable particles of small size in electrically conductive contact with each other and leaving pores between them, said dielectric layer substantially consisting of oxide compound of said metallic particles formed on the surface portions of said particles exposed to said pores, and the other one of said electrodes consisting of a solid substantially metallic substance filling said pores in intimate contact with said dielectric layer.

7. An electric device, such as a condenser and rectifier, composed of two electrodes separated by a dielectric layer, one of said electrodes consisting of a porous body composed of particles of small size, said particles consisting of a number, two as minimum, of elements at least one of which being a metal, said particles being in electrically conductive contact with each other and leaving pores between them, said dielectric layer provided on the surface portions of said particles exposed to said pores, and the other one of said electrodes consisting of a solid electrically conductive and dense substance filling said pores in intimate contact with said dielectric layer.

8. An electric device, such as a condenser and rectifier, composed of two electrodes separated by a dielectric layer, one of said electrodes consisting of a porous body composed of substantially metallic particles of small size in electrically conductive contact with each other and leaving pores between them, said dielectric layer provided on the surface portions of said particles exposed to said pores, and the other one of said electrodes consisting of metal filling said pores in intimate contact with said dielectric layer, a casing at least in part of conductive material enclosing said porous body and metal filling said pores, said casing in contact with said metal, a terminal connected with said body and insulatingly passing said casing, and another terminal connected to said conductive part of said casing.

9. A method of manufacturing an electric device, particularly condenser and rectifier, comprising the steps of shaping under pressure substantially metallic particles of small size, subjecting the shape to heat treatment up to and including presintering temperatures so as to obtain a coherent spongy body, applying a dense and coherent dielectric layer on other surface portions of said particles exposed to pores contained in said spongy body, introducing in said pores a conductive substance in liquid state and allowing it to solidify, and connecting said particles with one terminal and said substance with another terminal.

10. A method of manufacturing an electric device, particularly condenser and rectifier, comprising the steps of forming a body of substantially metallic particles of small size, contacting each other on portions of their surfaces and including pores, applying a dense and coherent dielectric layer on other surface portions of said particles exposed to said pores, introducing a substantially metallic substance in its liquefied state into said pores and allowing it to solidify in intimate contact with said layer within said pores, and connecting said particles with one terminal and said substance with another terminal.

11. A method of manufacturing an electric device, particularly condenser and rectifier, comprising the steps of shaping substantially metallic and oxidizable particles of small size, contacting each other on portions of their surfaces and including pores and thereby forming a spongy body, forming a dielectric layer on other surface portions of said particles exposed to said pores substantially by oxidation, introducing in said pores a conductive metallic substance in liquid state, and connecting said particles with one terminal and said substance with another terminal.

12. A method of manufacturing an electric device, particularly condenser and rectifier, comprising the steps of shaping substantially metallic particles of small size, contacting each other on portions of their surfaces and including pores and thereby forming a spongy body, forming a dense and coherent dielectric layer on other surface portions of said particles exposed to said pores substantially by depositing a dielectric substance on said surfaces from a liquid containing said dielectric substance suspended or dissolved, introducing in said pores a conductive substantially metallic substance in liquid state and allowing it to solidify, and connecting said particles with one terminal and said substance with another terminal.

13. An electric device, such as a static condenser and rectifier, composed of two electrodes separated by a dielectric layer, one of said electrodes consisting of a porous body composed of substantially metallic particles of small size connected with each other in contacting surface portions and leaving pores between them, said dielectric layer provided on the surface portions of said particles exposed to said pores, and the other one of said electrodes substantially consisting of metal filling said pores in intimate contact with said dielectric layer, at least one of said electrodes substantially consisting of a composition of at least two metals selected from the group consisting of aluminum, tantalum, beryllium, titanium, zirconium, magnesium, silicon, copper, nickel, iron and molybdenum.

14. An electric device, such as a static condenser and rectifier, composed of two electrodes separated by a dielectric layer, one of said electrodes consisting of a porous body composed of substantially metallic particles of small size connected with each other in contacting surface portions and leaving pores between them, said dielectric layer provided on the surface portions of said particles exposed to said pores, and the other one of said electrodes substantially consisting of metal filling said pores in intimate contact with said dielectric layer, at least one of said electrodes substantially consisting of a composition of at least one metal selected from a first group and at least one other metal selected from a second group, said first group consisting of titanium and zirconium and said second group consisting of aluminum, tantalum, beryllium, magnesium, copper, nickel, iron and molybdenum.

15. In an electric device, such as a static condenser and rectifier, as described in claim 3, the metallic composition of both electrodes being substantially the same.

DONALD E. GRAY.
JOSEPH O. OLLIER.